US007532990B2

(12) United States Patent
Rancourt et al.

(10) Patent No.: US 7,532,990 B2
(45) Date of Patent: May 12, 2009

(54) SYSTEM AND METHOD FOR PRESS SIGNATURE TRACKING AND DATA ASSOCIATION

(75) Inventors: Michael Raymond Rancourt, Merrimack, NH (US); Howie Hoff, Lee, NH (US)

(73) Assignee: Goss International Americas, Inc., Durham, NH (US)

( * ) Notice: Subject to any disclaimer, the term of this patent is extended or adjusted under 35 U.S.C. 154(b) by 0 days.

(21) Appl. No.: 11/243,657

(22) Filed: Oct. 4, 2005

(65) Prior Publication Data

US 2007/0078617 A1 Apr. 5, 2007

(51) Int. Cl.
*B41F 33/00* (2006.01)
*G06F 9/00* (2006.01)

(52) U.S. Cl. ........................ 702/84; 702/81; 101/93.01; 101/2

(58) Field of Classification Search .................. 702/84, 702/81
See application file for complete search history.

(56) References Cited

U.S. PATENT DOCUMENTS

| | | | | |
|---|---|---|---|---|
| 5,398,289 | A * | 3/1995 | Rourke et al. | 382/100 |
| 6,019,714 | A * | 2/2000 | Stab | 493/429 |
| 6,112,658 | A * | 9/2000 | Gunther et al. | 101/171 |
| 6,181,439 | B1 * | 1/2001 | Bronstein et al. | 358/1.9 |
| 6,377,247 | B1 * | 4/2002 | Halverson et al. | 345/173 |
| 6,440,049 | B1 * | 8/2002 | Belanger et al. | 493/14 |
| 6,441,914 | B1 * | 8/2002 | Barak et al. | 358/1.14 |
| 6,572,097 | B2 * | 3/2003 | d'Agrella et al. | 271/182 |
| 6,721,061 | B1 * | 4/2004 | Allen | 385/1.9 |
| 2002/0097407 | A1 * | 7/2002 | Ryan et al. | 358/1.1 |
| 2005/0040322 | A1 * | 2/2005 | Sjogren | 250/223 R |
| 2005/0124481 | A1 * | 6/2005 | d'Agrella et al. | 493/405 |
| 2006/0196936 | A1 * | 9/2006 | Christofferson et al. | 235/385 |

* cited by examiner

*Primary Examiner*—Hal D Wachsman
(74) *Attorney, Agent, or Firm*—Davidson, Davidson & Kappel, LLC

(57) ABSTRACT

In an exemplary embodiment of the present invention, a method for operation of a printing press includes the steps of generating unique individual signature identification information, tracking printing press operation information and associating the printing press operation information with the unique signature identification information. For use in a printing press arrangement, a system for tracking printing press operation, including: a plurality of sensors arranged in a preselected configuration in the printing press arrangement to sense preselected Printing press operation information; and a press control and tracking controller coupled to each of the plurality of sensors, the press control and tracking controller arranged and configured to receive inputs from the plurality of sensors to generate unique individual signature identification information, track printing press operation information and associate the printing press operation information with the unique signature identification information.

16 Claims, 2 Drawing Sheets

SYSTEM AND METHOD FOR PRESS SIGNATURE TRACKING AND DATA ASSOCIATION

BACKGROUND OF THE INVENTION

In a printing operation, a sheet of material such as newsprint, is feed from a roll mounted in a splicer, to a sequence of printing equipment, such as printing presses, a dryer, a chill roll, cutters, folders and delivery equipment. The output of the equipment is a plurality of signatures, each having a printed image. The individual signatures are assembled with other printed signatures to form a final product, such as a newspaper.

During the printing process, quality control measures are implemented to assure that certain parameters of the printed product, such as density, registration, ribbon position, fold and so on, are satisfactory and commercially acceptable. The determination of less than satisfactory parameters, and identification of the location of the less than satisfactory conditions have consistently presented technical challenges in respect of a precise and accurate sensing and tracking of the parameters. Accurate tracking of parameter quality, particularly with an ability to identify specific signature location, will provide an improved good count and waste count for the printing press output. An ability to accurately track specific signature locations would also facilitate insertion of unique and specific data on a preselected, specific signature, and provide improved overall control of the printing operation.

SUMMARY OF THE INVENTION

According to an exemplary embodiment of the present invention, a method for tracking printing press operation comprises the steps of generating unique individual signature identification information, tracking printing press operation information and associating the printing press operation information with the unique signature identification information.

According to a further exemplary embodiment of the present invention, the method includes the further step of processing individual signatures as a function of the associated unique signature identification information and corresponding printing press operation information.

In a yet further exemplary embodiment of the present invention, a system for tracking printing press operation is provided for use in a printing press arrangement. The system comprises a plurality of sensors arranged in a preselected configuration in the printing press arrangement to sense preselected printing press operation information, and a press control and tracking controller coupled to each of the plurality of sensors. The press control and tracking controller is arranged and configured to receive inputs from the plurality of sensors to generate unique individual signature identification information, track printing press operation information and associate the printing press operation information with the unique signature identification information.

DETAILED DESCRIPTION OF THE PREFERRED EMBODIMENTS

Figure 1:
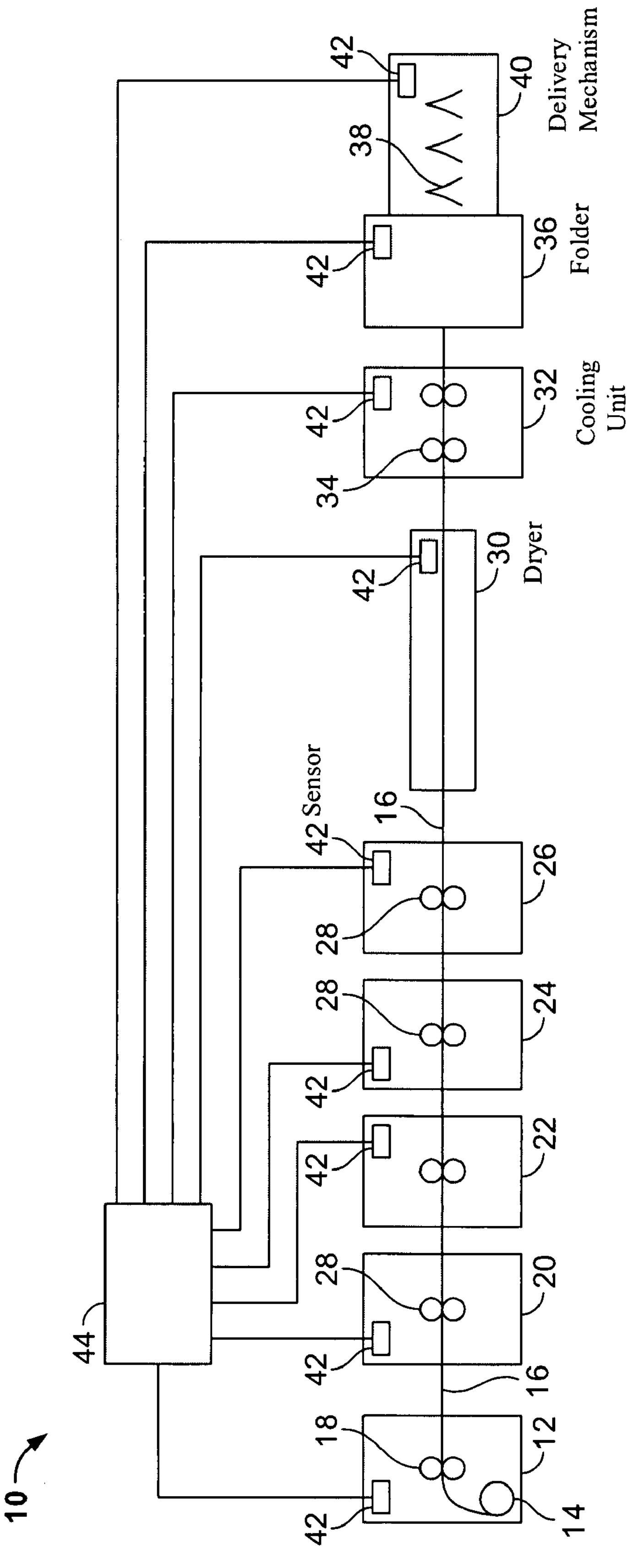
FIG. 1 is a schematic block diagram of a printing press, including a press control and tracking system in accordance with a feature of the present invention.

Referring now to the drawings, and initially to FIG. 1, there is shown a schematic block diagram of a known printing press arrangement, arranged to include a tracking system in accordance with a feature of the present invention. The printing press arrangement 10 includes a splicer 12 that mounts a roll 14 of product such as, for example, a roll of newsprint 16. The newsprint 16 is feed from the mounted roll 14 by a pair of drive rollers 18 to a sequence of printers 20, 22, 24, 26.

Each of the printers 20, 22, 24, 26 comprises rollers 28 arranged and configured to impress an image on the newsprint 16 as it passes between the rollers, in well known printing techniques. The printers 20, 22, 24 26 may each apply a different color ink, for example, the three primary colors and black.

A dryer 30 is arranged downstream from the printers 20, 22, 24, 26. The dryer 30 is used to apply heat to the passing newsprint 16 to dry the ink of the images impressed by the printers 20, 22, 24, 26. The newsprint 16 then passes to a cooling unit 32, for passage between water cooled rollers 34 before entry into a folder 36. The folder 36 cuts and folds the roll of newsprint 16 into individual signatures 38 for input to a delivery mechanism 40, as well known in the art.

Pursuant to a feature of the present invention, a plurality of printing press operation information sensor components 42 is provided in the printing press arrangement 10, as shown in FIG. 1. The sensor components 42 are variously arranged and configured to sense such operating and product quality control parameters as press speed, press operating events, product image density, registration, ribbon position, fold and so on. The sensor components 42 are each coupled as inputs to a press control and tracking controller 44. In a preferred embodiment of the present invention, the press control and tracking controller 44 comprises a computer.

Figure 2:
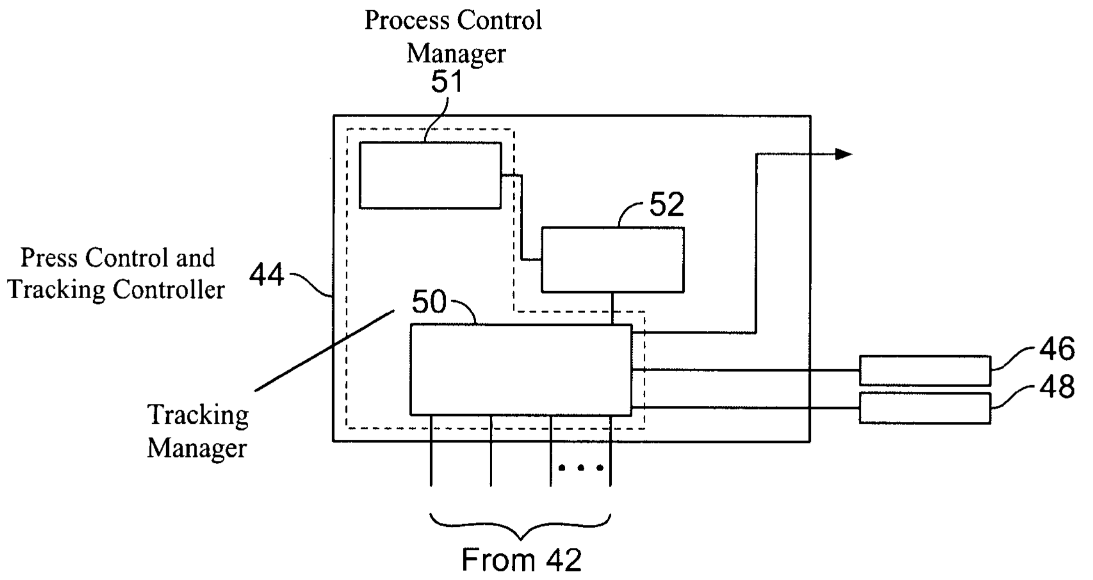
FIG. 2 is a block diagram of the press control and tracking system of FIG. 1.

Referring now to FIG. 2, there is shown a block diagram of the press control and tracking controller 44 of FIG. 1. As discussed above, the computer 44 receives as inputs the outputs of the various sensor components 42. The computer is also coupled to a press data bank 46 and a job data bank 48. The press data bank 46 stores information such as the operating parameters and technical characteristics of the printing press arrangement 10. The job data bank 48 stores information relevant to the particular printing job being carried out on the printing press arrangement 10. The computer 44 comprises a press signature tracking manager 50, a process control manager 51 and a press signature queue 52. In a preferred embodiment of the present invention, the press signature tracking manager 50 and the process control manager 51 each comprise a software module executed by the computer 44, and the press signature queue comprises a memory space within the computer 44.

In accordance with a feature of the present invention, the press signature tracking manager 50 of the computer 44 utilizes input information received from the sensors 42 to generate a signature information table in the queue 52. The table is arranged to provide a queue that associates printing press operation information represented by the input information obtained from the sensors 42 with identification information that uniquely identifies each individual signature produced by the printing press arrangement 10.

For example, the sensor 42 provided in the splicer 12 can be arranged and configured as an encoder to sense printer speed to indicate the speed at which the newsprint 16 is passing through the arrangement 10. From the speed information input by the sensor 42 to the computer 44, from data stored in the press data bank 46 and the job data bank 48 and a measure of elapsed time, the press signature tracking manager 50 calculates when each length of newsprint 16 that corresponds to a signature length, has been output by the splicer 12, and generates a unique indicia for each signature length. (In the event that the newsprint 16 is two signatures wide, two indicia can be generated per signature length). Thus, each signature produced by the arrangement 10 will have a unique identification which is stored by the computer 44 in the queue 52.

Figure 3:
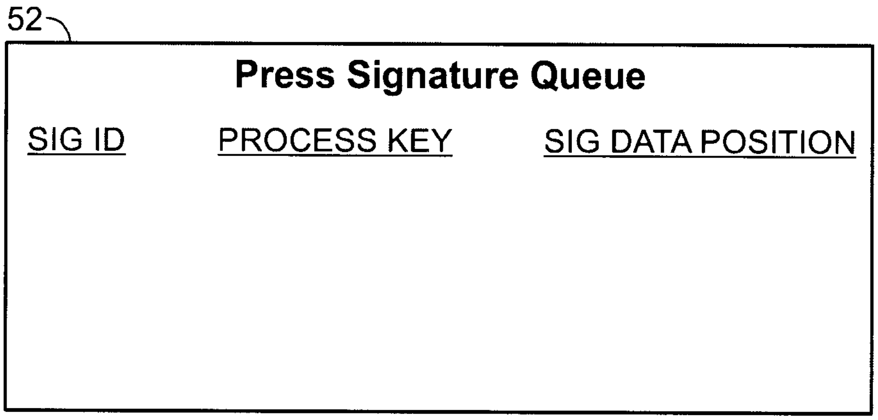
FIG. 3 is a diagram of a press signature queue table maintained in the press control and tracking system of FIG. 2, according to a feature of the present invention.

As shown in FIG. 3, the table comprises a series of columns labeled SIG ID, PROCESS KEY, SIG DATA and POSITION. The press signature tracking manager 50 lists the generated unique signature identifications sequentially in the SIG ID column. The press signature tracking manager 50 continuously monitors elapsed time and printer speed to track the location of each uniquely identified signature as it moves through the arrangement 10, and indicates current location in the POSITION column.

In addition, the press signature tracking manager 50 continuously monitors the inputs received from the various sensors 42. The sensors 42 may include densitometers, color spectrometry, registration sensors, cutoff sensors, fold sensors, and so on. These sensors are arranged to provide quality control information for the signatures as they move through the printing press arrangement 10. The PROCESS KEY column lists indications corresponding to the various sensors. From the press data bank 46, the press signature tracking manager 50 determines the position within the printing press arrangement 10, of each sensor 42 corresponding to the PROCESS KEY indication. In accordance with a feature of the present invention, the press signature tracking manager 50 associates a sensor output for a specific PROCESS KEY indication received as an input, with the particular signature passing the position of the sensor 42 at the time sensor output is received. The press signature tracking manager 50 then stores the particular sensor output in the SIG DATA column corresponding to the SIG ID of the signature at the sensor at the time of the output.

In this manner, the table of the press signature queue 52 provides detailed quality control information on each individual signature as it passes through the printing press arrangement 10. In accordance with another feature of the present invention, the process control manager 51 accesses the press signature queue 52 to process the quality control information for each individual signature. Parameter ranges for the signatures are input to the process control manager 51. These can include, for example, density ranges for each color, cutoff control ranges and fold target ranges. The process control manager 51 parses the table of the press signature queue 52, and for each signature listed in the SIG ID column, compares the data from the sensors 42 for that specific signature to the stored ranges to make an accept, reject termination.

Control signals can be transmitted by the process control manager 51 to downstream operations to divert rejected signatures to designated bins. The specific rejected signature can be diverted to a bin as a function of the nature of the rejection, to facilitate analysis and tracking of specific reasons for product rejection.

According to another feature of the present invention, process control manager 51 can control certain press operations to print customer specific information on certain ones of the identified signatures. Moreover, the process control manager 51 can control the application of other components such as scents, to specific signatures.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for operation of a printing press, comprising the steps of:

generating a unique individual signature identification information, the generating including calculating a length of a newsprint upstream of printing units of the printing press;

tracking printing press operation information;

associating the printing press operation information with the unique signature identification information; and processing individual signatures as a function of the associated unique signature identification information and corresponding printing press operation information.

2. The method of claim 1 wherein the steps of generating, tracking and associating are performed by a computer.

3. The method of claim 2 wherein the computer is operated to generate a process signature queue listing associated unique signature identification information and corresponding printing press operation information.

4. The method of claim 1 wherein the printing press operation information comprises printing press operating parameters and signature quality control information.

5. The method of claim 1 wherein the unique individual signature identification information includes unique identifying indicia for each of a sequence of specific signatures.

6. The method as recited in claim 1 wherein the calculating the length of newsprint includes determining a speed of the newsprint and an elapsed time.

7. The method as recited in claim 1 wherein a single unique individual signature identification of the unique individual signature identification information is generated each time the length of the newsprint corresponds to a signature length.

8. The method as recited in claim 7 wherein two unique individual signature identifications of the unique individual signature identification information are generated each time the length of the newsprint corresponds to a signature length.

9. The method as recited in claim 1 wherein the calculating the length of the newsprint occurs as the newsprint is output by a splicer.

10. For use in a printing press arrangement, a system forcontrolling operation of a printing press, which comprises:

a plurality of sensors arranged in a preselected configuration in the printing press arrangement to sense preselected printing press operation information; and a press control and tracking controller coupled to each of the plurality of sensors;

the press control and tracking controller arranged and configured to receive inputs from the plurality of sensors to generate unique individual signature identification information and determine a length of newsprint upstream of printing units of the printing press, track the preselected printing press operation information and associate the preselected printing press operation information with the unique individual signature identification information.

11. The system of claim 10 wherein the press control and tracking controller comprises a press signature tracking manager, a process control manager and a press signature queue.

12. The system of claim 11 wherein the press signature tracking manager generates printing press operation information associated with unique signature identification information, and stores the associated information in the press signature queue.

13. The system of claim 12 wherein the process control manager controls operation of the printing press arrangement as a function of the associated information stored in the press signature queue.

14. The system of claim 11 wherein the press control and tracking controller comprises a computer, and wherein each of the press signature tracking manager and process control manager comprises a software module executing in the computer.

15. The system of claim 14 wherein the press signature tracking manager executes to generate printing press operation information and associates the generated printing press operation information with unique signature identification information, and stores the associated information in the press signature queue and the process control manager executes to control operation of the printing press arrangement as a function of the associated information stored in the press signature queue.

16. The system as recited in claim 10 wherein the determining the length of newsprint occurs as the newsprint is output by a splicer.

* * * * *